(12) United States Patent
Wickel

(10) Patent No.: US 8,424,185 B2
(45) Date of Patent: Apr. 23, 2013

(54) METHOD FOR RIVETING TWO COVER PLATE ELEMENTS OF A TORSIONAL VIBRATION DAMPER ARRANGEMENT

(75) Inventor: Christian Wickel, Wartmannsroth (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 257 days.

(21) Appl. No.: 12/848,525

(22) Filed: Aug. 2, 2010

(65) Prior Publication Data
US 2011/0035929 A1    Feb. 17, 2011

(30) Foreign Application Priority Data
Aug. 12, 2009   (DE) .................. 10 2009 028 466

(51) Int. Cl.
B21J 15/02 (2006.01)
B21D 39/00 (2006.01)

(52) U.S. Cl.
USPC ........ 29/524.1; 29/525.06; 103/278; 103/282

(58) Field of Classification Search ............ 29/432.1, 29/432.2, 505, 524.1, 525.05, 525.06, 798, 29/243.5, 243.53; 403/278, 282
See application file for complete search history.

(56) References Cited

U.S. PATENT DOCUMENTS
2005/0097722 A1* 5/2005 Muller et al. .............. 29/525.06

* cited by examiner

Primary Examiner — Jermie Cozart
(74) Attorney, Agent, or Firm — Cozen O'Connor

(57) ABSTRACT

A method for riveting two structural component parts arranged with their inner sides facing one another and with their outer sides facing away from one another at a distance from one another by at least one spacer rivet element. Positioning the at least one spacer rivet element at the two structural component parts such that rivet element end areas extend through rivet openings provided in the structural component parts to be associated with the rivet element end areas. Supporting a rivet element end area at the outer side of one of the structural component parts. Supporting the other of the structural component parts at its inner side. Applying a riveting force to the other rivet element end area to deform at least one rivet element end area and to form a rivet head.

21 Claims, 8 Drawing Sheets

Fig. 4
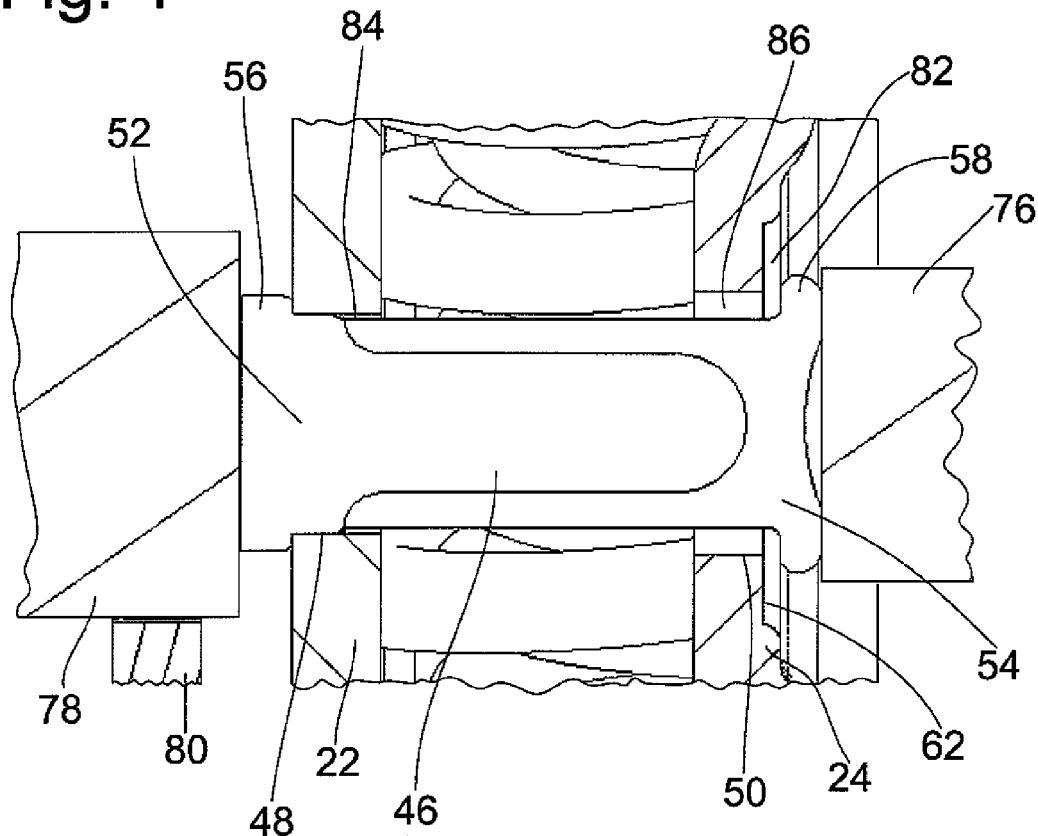
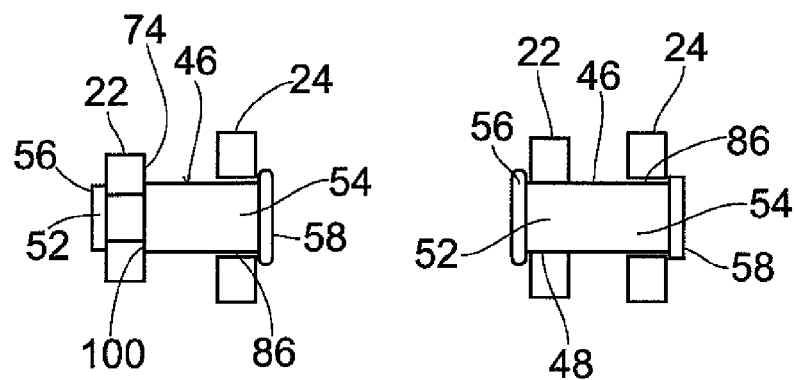
Fig. 11    Fig. 12

METHOD FOR RIVETING TWO COVER PLATE ELEMENTS OF A TORSIONAL VIBRATION DAMPER ARRANGEMENT

BACKGROUND OF THE INVENTION

1. Field of the Invention

The present invention is directed to a method for riveting two structural component parts, which are arranged so that their inner sides face one another and their outer sides face away from one another, in particular cover plate elements of a torsional vibration damper arrangement, at a distance from one another by at least one spacer rivet element.

2. Description of the Related Art

FIG. 1 is a longitudinal sectional view of a torsional vibration damper arrangement, designated in its entirety by 10, such as is used in the torque transmission path between a lockup clutch in a hydrodynamic torque converter and a driven shaft such as, e.g., the transmission input shaft, or generally in a wet multiple-disk clutch or the like. The torsional vibration damper arrangement 10 is constructed in two-tiered manner with two torsional vibration damper areas 12, 14 acting in series. An input area of the radially outer first torsional vibration damper area comprises a central disk element 16 connected by a plurality of rivet bolts 18 to an inner disk carrier 20 so as to be fixed with respect to rotation relative to it. An output area of this first torsional vibration damper area 12 comprises two cover plate elements 22, 24 arranged at a distance from one another in direction of an axis of rotation A. In their radially outer area, these cover plate elements 22, 24, like the center disk element 16, form circumferential supporting areas for the damper springs 26 of the first torsional vibration damper area 12.

The two cover plate elements 22, 24 form, in their radially inner area, the input area of the second torsional vibration damper area 14 and have in that location respective circumferential supporting areas for the damper springs 28 of the second torsional vibration damper area 14. Another center disk element 30 which is arranged on the radially inner side of the center disk element 16 provides circumferential supporting areas for the damper springs 28 and its radially outer area forms the output area of this second torsional vibration damper area 14. The center disk element 30 is fixedly connected on the radially inner side to a flange 34 of a hub 36 acting as driven element by a plurality of rivet bolts 32.

In order to obtain a defined, stable positioning of the two cover plate elements 22, 24 with the two center disk elements 16, 30 being received therebetween, the two cover plate elements are connected to one another in their radially inner area, i.e., also on the radially inner side of the damper springs 28 of the second torsional vibration damper area 14, by a plurality of rivet bolts 38 arranged successively in circumferential direction. In order to ensure a defined axial spacing, these rivet bolts 38 have a double-stepped longitudinal section with a spacing area 40, which is located between the two cover plate elements 22, 24, and end areas 42, 44 which project through the cover plate elements 22, 24. In order to produce a fixed connection, these end areas 42, 44, shown in undeformed state in FIG. 1, must be deformed by applying a corresponding riveting force to form rivet heads which then lie on the outer side of the two cover plate elements 22, 24.

Particularly under the influence of centrifugal force, the damper springs 28 of the radially inner second torsional vibration damper area 14, which are also supported at the cover plate elements 22, 24 on the radially outer side are forced outward and generate a force that loads the two cover plate elements 22, 24 in a direction away from one another. This can cause them to spread apart, which cancels the exact positioning of the two cover plate elements 22, 24 with respect to one another for purposes of a defined damping characteristic, also in the area of the first torsional vibration damper area 12.

To remedy this problem, the two cover plate elements 22, 24 are connected to one another in their area located between the damper springs 26 and 28, respectively, of the two torsional vibration damper areas 12, 14 by spacer rivet elements 46'. The only function of these spacer rivet elements 46' is to prevent the two cover plate elements 22, 24 from spreading apart excessively. They do not serve to ensure a defined minimum axial distance and also do not serve to transmit torque between the two cover plate elements 22, 24. The respective rivet element end areas 52, 54 of the spacer rivet elements 46' can be received in the associated rivet openings 48, 50 of the two cover plate elements 22, 24 while retaining a movement play so that it is possible in principle for the spacer rivet elements 46' to tilt with respect to the two cover plate elements 22, 24. However, the rivet heads 56, 58 of the spacer rivet elements 46 engage behind the cover plate elements 22, 24 at their outer sides 60, 62 facing away from one another and prevent them from spreading apart excessively.

In order to provide an arrangement in the area of these spacer rivet elements which is as stable as possible, the spacer rivet elements are preferably formed in such a way that they have no step-like widened portion, for example, to allow the two cover plate elements 22, 24 to be supported on one another. Since this is not the function of these spacer rivet elements 46', this would only run the unnecessary risk that stresses occur in the area of step-like transitions when the spacer rivet elements are loaded which could result in breakage.

SUMMARY OF THE INVENTION

It is an object of the present invention to provide a method for riveting two structural component parts which are arranged in such a way that their inner sides face one another and their outer sides face away from one another, particularly cover plate elements of a torsional vibration damper arrangement, at a distance from one another by at least one spacer rivet element by which a rivet head can be formed at least at one rivet end area while maintaining a defined distance between the two structural component parts to be connected.

According to one embodiment of the invention, a method is provided for riveting two structural component parts arranged in such a way that their inner sides face one another and their outer sides face away from one another, particularly cover plate elements of a torsional vibration damper arrangement, at a distance from one another by at least one spacer rivet element, comprising the following:

a) positioning the at least one spacer rivet element at the two structural component parts in such a way that rivet element end areas extend through rivet openings which are provided in the structural component parts so as to be associated with the rivet element end areas;

b) supporting a rivet element end area at the outer side of one of the structural component parts;

c) supporting the other structural component part at its inner side; and d) applying a riveting force to the other rivet element end area to deform at least one rivet element end area and form a rivet head.

In the riveting method according to the invention, the spacer rivet elements used for connecting are accordingly not only loaded and acted upon by riveting force in their two rivet element end areas so as to form one or possibly two rivet heads, but also at least one of the structural component parts is supported at its inner side and accordingly remains positioned in a defined manner with respect to the other structural component part when introducing a riveting force which is applied for forming a rivet head and which can be transmitted through the formed rivet head to the structural component part, and it is accordingly ensured that the distance to be provided between the two structural component parts is maintained.

The other structural component part can be supported by a first supporting arrangement which extends through, or past, one structural component part, and the first supporting arrangement preferably supports the other structural component part by at least one and preferably a plurality of first supporting portions.

In order to ensure a defined supporting interaction, the first supporting arrangement engages directly with the other structural component part for supporting the same. Alternatively, particularly when another assembly which possibly might not allow through-penetration is arranged between the two structural component parts to be connected, it can be provided that the supporting arrangement engages at an assembly which supports the other structural component part and which is arranged between the two structural component parts.

In order to provide the reaction force required for deforming a spacer rivet element, it can be provided further that the first supporting arrangement comprises a second supporting portion for supporting the rivet element end area associated with the one structural component part.

In so doing, it can further be provided for ensuring the required distance between the two structural component parts that the at least one first supporting portion and the second supporting portion are arranged so as to be substantially immovable relative to one another at least when carrying out a riveting process.

A defined positioning of the structural component parts relative to one another when carrying out the riveting process can be further assisted in that a hold-down arrangement which presses the other structural component part into supporting contact is associated with the first supporting arrangement, and it can be provided that the hold-down arrangement comprises a pretensioning or preloading assembly which acts on the outer side of the other structural component part.

The riveting force can be introduced, for example, by a rivet stamp acting upon the rivet element end area associated with the other structural component part.

To carry out a riveting process in a simple, but at the same time, very precise manner, a flexible preloading arrangement is movable at least in some areas with the rivet stamp toward the other structural component part.

Further, the distance to be maintained between the two structural component parts can be ensured, particularly when a spacer rivet element is to be deformed in both end areas to form a rivet head, in that step c) includes the supporting of one structural component part at its inner side. In this way, the one structural component part is supported by a second supporting arrangement which extends through, or past, the other structural component part.

In order that the two structural component parts can also be positioned relative to one another in a highly precise manner with the type of support mentioned above when carrying out the riveting process, it is proposed that the second supporting arrangement comprises at least a third supporting portion which is connected with the rivet stamp so as to be substantially immovable at least when carrying out a riveting process.

As has already been explained, it is advantageous when at least one spacer rivet element used for riveting the two structural component parts has no supporting area between its rivet element end areas for supporting the two structural component parts toward one another. In this manner, it is ensured that the rivet heads prevent a movement of the two structural component parts in the direction away from one another and accordingly reliably maintain the distance, while, at the same time, no tensions can be generated under loads at transitional areas or corner areas which could result in damage to the spacer rivet elements.

When at least one spacer rivet element used for riveting the two structural component parts has a pre-shaped rivet head in one of its rivet element end areas and is deformed in its other rivet element end area to form a rivet head when acted upon by the riveting force, the precision with which the riveting process is carried out can be further increased and, to this extent, the two structural component parts can also be positioned and held relative to one another more precisely.

Further, it can be provided that at least one spacer rivet element used for riveting the two structural component parts does not have a pre-shaped rivet head in either of its rivet element end areas and is deformed in both rivet element end areas to form a rivet head when acted upon by the riveting force.

To ensure that the spacer rivet elements which are to be used can be arranged at the structural component parts in a simple manner and without requiring excessive precision, it is proposed that at least one of the rivet openings associated with a spacer rivet element is formed in the two structural component parts so as to be overdimensioned with respect to an outer dimensioning of the spacer rivet element in the associated rivet element end area.

Further, to ensure that only the distance of the structural component parts in direction away from one another is maintained after carrying out the riveting process, but that otherwise no additional forces can be transmitted between these structural component parts by the spacer rivet elements, the overdimensioning is maintained at least partially when deforming the spacer rivet element in this rivet element end area.

This can be achieved, for example, in that the spacer rivet element is made with hardened metal material at least in this rivet element end area. It is ensured through the use of a spacer rivet element with hardened metal material that this spacer rivet element will not spread out toward the radial outer side when the riveting force is applied, but rather that the rivet head will only form on the outer side of the associated structural component part.

In an alternative process in which a more stable holding of a spacer rivet element can also be ensured with respect to tilting, the overdimensioning is eliminated substantially in its entirety in this rivet element end area when deforming the spacer rivet element. This can be achieved, for example, in that the spacer rivet element is made of unhardened metal material at least in this rivet element end area. A spacer rivet element of unhardened metal material is comparatively soft and will spread out radially when riveting force is applied so that, given a corresponding force, it contacts the inner circumference of the associated rivet opening and the spacer rivet element is accordingly also prevented from tilting or shifting axially with respect to this structural component part.

The present invention is further directed to a riveting device by which the method described above, for example, can be carried out. This device comprises:

a first supporting arrangement with a supporting portion for supporting a rivet element end area which is positioned so as to be associated with one of the structural component parts to be connected to one another, and at least one additional supporting portion for supporting the other of the two structural component parts to be connected to one another at its inner side facing a structural component part, a rivet stamp for applying a riveting force to a rivet element end area which is positioned so as to be associated with the other structural component part for forming a rivet head in at least one of the rivet element end areas.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described in more detail in the following with reference to the accompanying drawings. In the drawings:

FIG. 4 is an enlarged detailed view of the spacer rivet element shown in FIG. 3;

FIG. 11 is a view with an alternative construction of the spacer rivet element; and FIG. 12 is a view corresponding to FIG. 11 of another alternative construction of a spacer rivet element.

DETAILED DESCRIPTION OF THE PRESENTLY PREFERRED EMBODIMENTS

With reference to different examples, the following description will illustrate how two structural component parts which are made of sheet metal material can be connected to one another by one spacer rivet element, but generally by a plurality of spacer rivet elements, in such a way that a specified maximum distance between the two structural component parts to be connected to one another is ensured by rivet elements of this kind. The two structural component parts to be connected to one another in the example are the cover plate elements, or cover plates, of a torsional vibration damper arrangement such as that which was described by way of example with reference to FIG. 1. Of course, other structural component parts in other fields of application can also be connected to one another in the manner described in the following.

Figure 2:
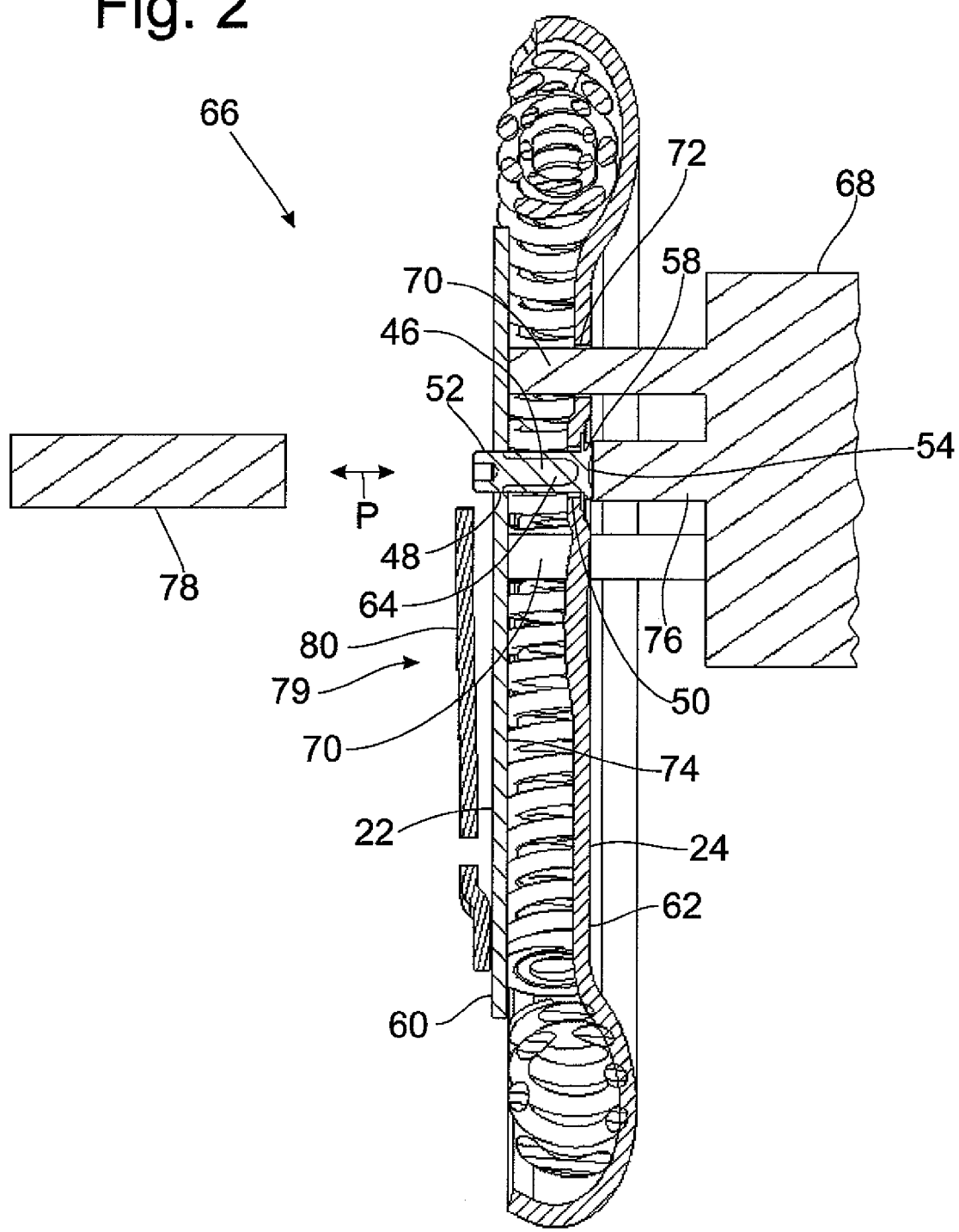
FIG. 2 is a step in the process for producing a torsional vibration damper arrangement in which the two cover plate elements are connected by spacer rivet elements to prevent them from moving axially away from one another.

FIG. 2 shows the two cover plate elements 22, 24 which are arranged opposite one another and which also are, or can be, fixedly connected to one another, for example, at their radially inner areas, in the manner described above. Further, these two cover plate elements 22, 24 are fixed so as to be prevented from moving away from one another in an area situated farther outward radially by one or preferably more spacer rivet elements 46 arranged so as to be distributed along a circumference of the cover plate elements 22, 24. Rivet openings 48, 50, each of which serves to receive a spacer rivet element 46, are provided in the cover plate elements 22, 24 and associated with the respective spacer rivet elements 46.

Figure 1:
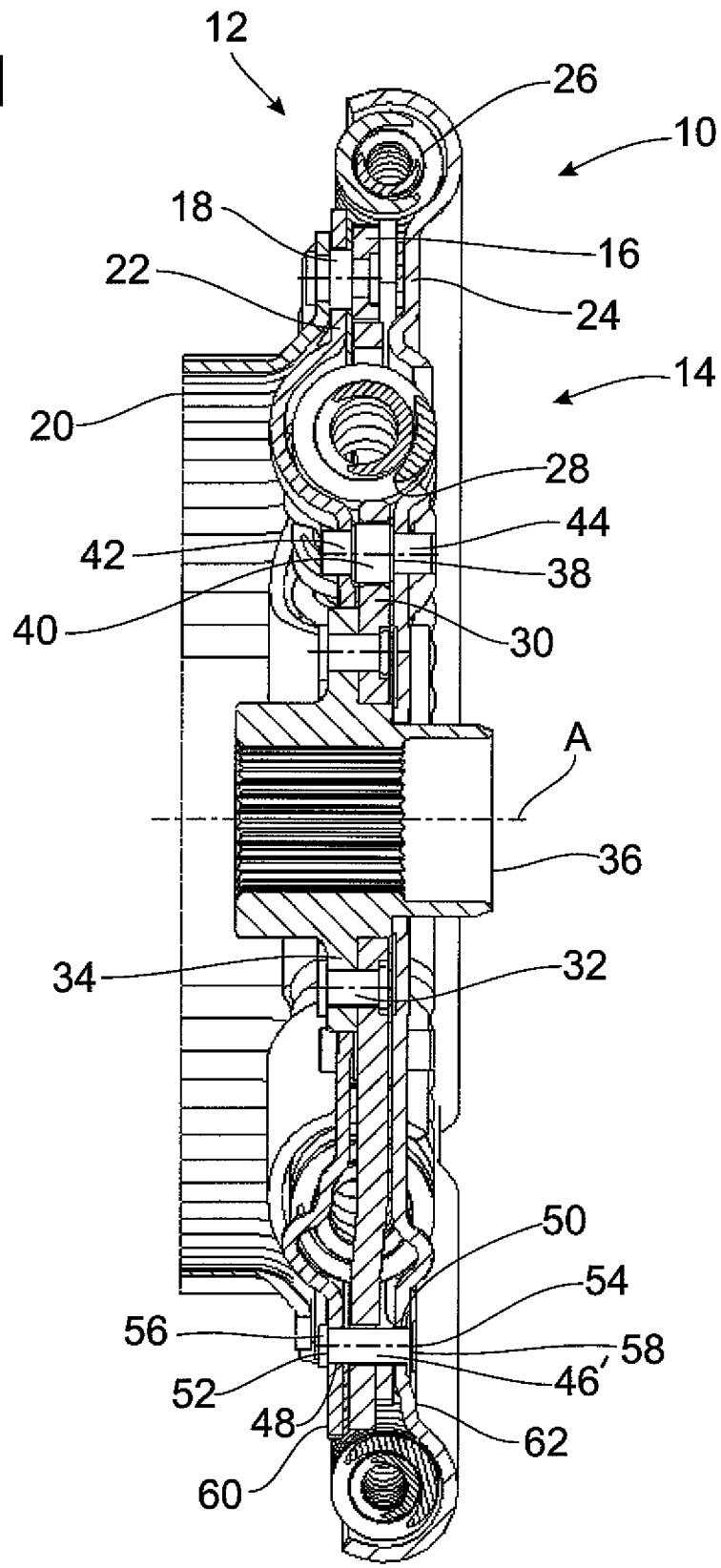
FIG. 1 is a longitudinal section through a torsional vibration damper arrangement with two cover plate elements which are positioned at an axial distance relative to one another.

For example, after the two cover plate elements 22, 24 have been connected to one another by the rivet bolts 30 shown in FIG. 1 and are basically already held in a defined axial position with respect to one another, the spacer rivet elements 46 are inserted, for example, successively, in the area situated farther outward radially. These spacer rivet elements 46 can be formed in such that a rivet head 58 is already pre-shaped on the spacer rivet element 46 so as to be allocated to one of the cover plate elements 22, 24, in this case cover plate element 24. For the rest, the spacer rivet element 46 has a body area 64 between its two rivet element end areas 52, 54 which extends substantially without any radial widening or narrowing. The riveting is carried out by a riveting device, designated in its entirety by 66, which has, on the right-hand side in FIG. 2, a first supporting arrangement 68 basically serving as an abutment. In the present example, this first supporting arrangement 68 which is formed of a metal part comprises two first supporting portions 70 which engage through associated through-openings 72 in the cover plate element 24. In the arrangement shown in FIG. 2, no additional structural component parts are located between the two cover plate elements 22, 24 so that the first supporting portions 70 can be supported directly against the inner side 74 of the cover plate element 22.

A second supporting portion 76 is positioned with respect to the first supporting portions 70 in such a way that when the latter are positioned so as to engage through the through-openings 72, the second supporting portion 76 lies directly opposite the rivet head 58 which is already pre-shaped and the rivet element end area 54. The first supporting portions 70 and the second supporting portion 76 are adapted to one another with respect to length in such that the first supporting portions 70 define a position for the cover plate element 22 at the desired distance from the cover plate element 24 when the second supporting portion 76 contacts the rivet element end area 54 and the rivet head 58 formed at the latter, taking into account the maximum distance to be specified for the two cover plate elements 22, 24.

The first supporting arrangement 68 can be constructed such that the different supporting portions 70, 76, which are formed thereon are provided as rigid portions of a metal structural component part, which are also substantially immovable relative to one another. In order to adjust different distances in the manufacturing process with different pairs of structural component parts to be connected to one another, it is possible, for example, to design the second supporting portion 76 and/or the first supporting portions 70 so as to be variable in length, but in such a way that a defined position is maintained when carrying out a riveting process.

Further, the riveting device 66 comprises a rivet stamp 78 which is arranged at the other side with respect to the structural component parts to be riveted, i.e., in this case, the two cover plate elements 22, 24. This rivet stamp 78 is to be moved toward and away from the spacer rivet element 46 to be stamped as is indicated by an arrow P and can be pressed against the latter with the riveting force required for deforming the rivet element end area 52. It can be seen from the embodiment shown in the drawing that the rivet element end area 52 of the spacer rivet element 46 to be acted upon by the rivet stamp 78 and accordingly deformed is as yet not deformed, i.e., is formed without a rivet head. In order to make the spacer rivet element easier to deform, the spacer rivet element can be provided with an axially open cutout in this end area.

After the spacer rivet element 46 has been arranged in the associated rivet openings 48, 50 in the position shown in the drawing and the first supporting arrangement 68 has been positioned in such a way that it gives a defined position for the spacer rivet element 46 with respect to the two cover plate elements 22, 24, the cover plate element 24 is pressed against the first supporting portions 70 with a defined force by a hold-down arrangement which, in the present instance, is in the form of a spring element 80 constructed as a leaf spring. This force can be ensured by activation of the hold-down arrangement 79 in a force-controlled or force-regulated manner, for which purpose, for example, the spring element 80 can be movable along with the rivet stamp 78 so that the hold-down force generated by the increasing tension of the spring element 80 increases during this axial movement until it reaches the desired magnitude. This ensures a defined contact of the cover plate element 22 against the first supporting portions 70 regardless of any tolerances of the structural component parts.

Figure 3:
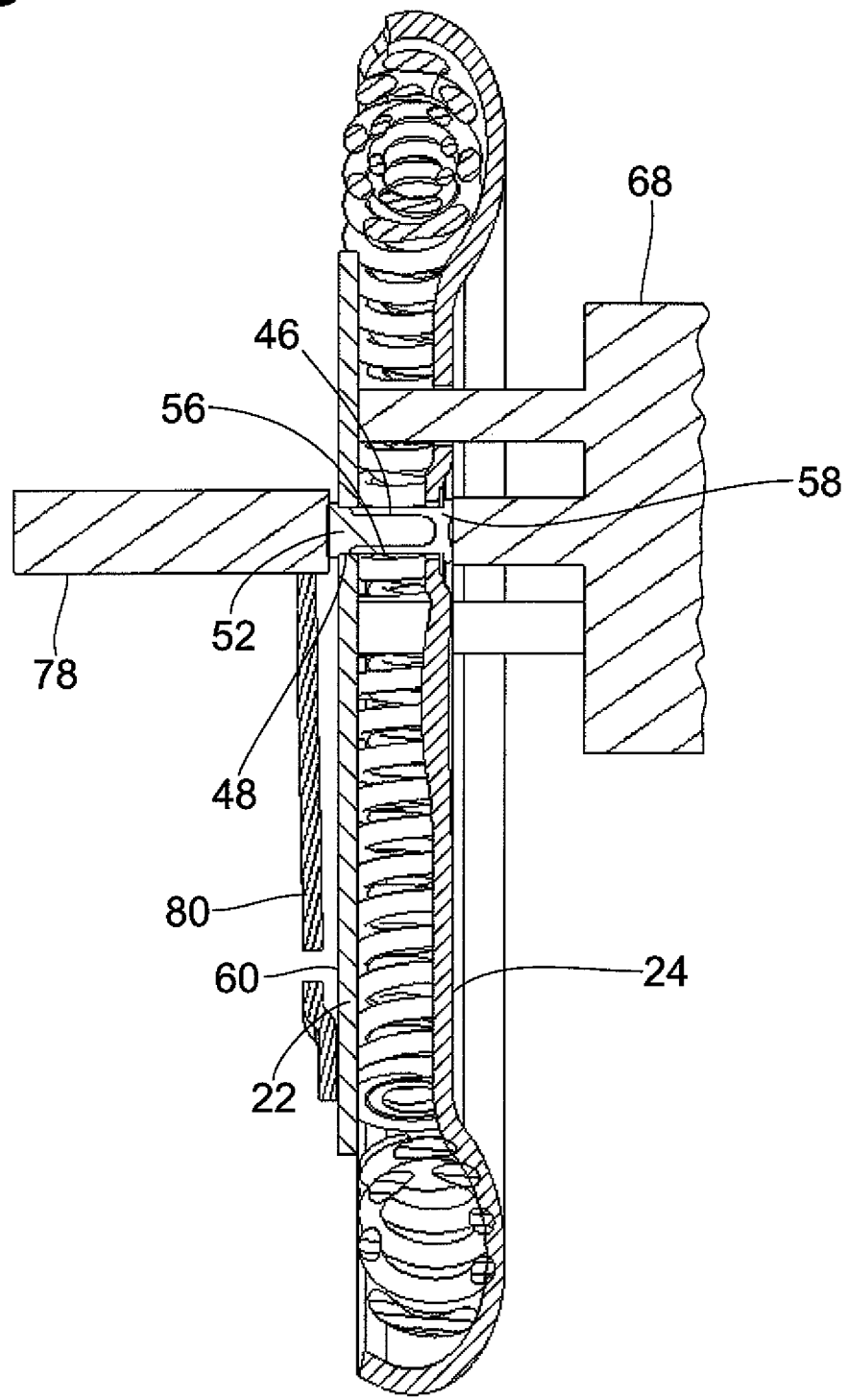
FIG. 3 is a step in the production process following the formation of a rivet head.

The rivet stamp 78 is then be moved axially toward the spacer rivet element 46 whose rivet element end area 52 is to be deformed so as to form a rivet head and is pressed on the rivet element end area 52 with the desired riveting force. In so doing, as is illustrated by FIG. 3, the rivet head 56 is formed in this rivet element end area 52 and spreads out around the rivet opening 48 at the outer side 60 of the cover plate element 22. In this way, it is ensured by means of the two rivet heads 56, 58 located at a defined distance from one another that the two cover plate elements 22, 24 cannot move apart farther than is defined by the clear distance between the two rivet heads 56, 58.

After the desired deformation of the spacer rivet element 46 has been achieved, the rivet stamp 78 can be moved back again, possibly together with the spring element 80. Also, the first supporting arrangement 68 can be moved away from the two cover plate elements 22, 24 which are to be connected to one another in order to insert the next spacer rivet element 46 in another riveting process.

FIG. 4 shows an enlarged view of the area with the spacer rivet element 46 and its two rivet heads 56, 58. It can be seen that the rivet head 58 which is already pre-shaped is at a slight distance 82 from the outer side 62 of the cover plate element 24 in this position. This distance is substantially given by the position of the supporting portions 70, 76 and the shape of the cover plate element 24. As a result, a axial movement play of the cover plate element 24 relative to the rivet head 58, which can basically be permitted in operation, remains after carrying out the riveting process. However, it is ensured in this case too that a certain maximum distance between the two cover plate elements 22, 24 may not be exceeded by the relative position of the two rivet heads 56, 58 with respect to one another.

Further, it can be seen from FIG. 4 that an intermediate space 84 existing between the spacer rivet element 46 and the area of the cover plate element 22 surrounding the rivet opening 48 has been filled during the deformation process as a result of the deformation of the spacer rivet element 46 in the rivet element end area 52 in which the rivet head 56 has been formed by the rivet stamp 78; i.e., in this state, the spacer rivet element 46 is substantially fixedly anchored in the rivet opening 48 and also axially fixed by the frictional engagement.

It can also be seen that an intermediate space 86 of this kind is provided so as to be associated with the other rivet element end area 54 and is also retained due to the fact that a deformation has not occurred in the rivet element end area 54. This means that despite the fact that the spacer rivet element 46 is supported by its rivet element end area 52 at the cover plate element 22 so as to be substantially fixed axially and with respect to tilting, the two cover plate elements 22, 24 can move axially as well as in circumferential direction with respect to one another to a permissible extent.

This configuration can be achieved, for example, in that a blank which is not hardened, i.e., is formed of comparatively soft metal material, particularly in its rivet element end area 52, is used for the spacer rivet element 46. In its area situated farther toward the inner side in which there is no corresponding deformation visible in FIG. 4, it can be arranged, for example, by hardening, that a corresponding deformation of the spacer rivet element 46 cannot occur when the riveting force is applied. The magnitude of elongation of the length area which is deformed when riveting force is applied can be specified depending on how far in the direction of the rivet element end area 52 the spacer rivet element 46 is hardened. When the spacer rivet element 46 is hardened in the entire rivet element end area 52 or at least in that area that is positioned in the rivet opening 48, a configuration can be achieved in which tilting play of the spacer rivet element 46, which is possible or achievable in principle, is also retained in the rivet element end area 52 to be deformed. The extent of possible tilting play can be adjusted based on the intermediate space 84 and 86, respectively, i.e., by adjusting the overdimensioning of the respective rivet opening 48 or 50 with respect to the outer dimensioning of the spacer rivet element 46.

Figure 5:
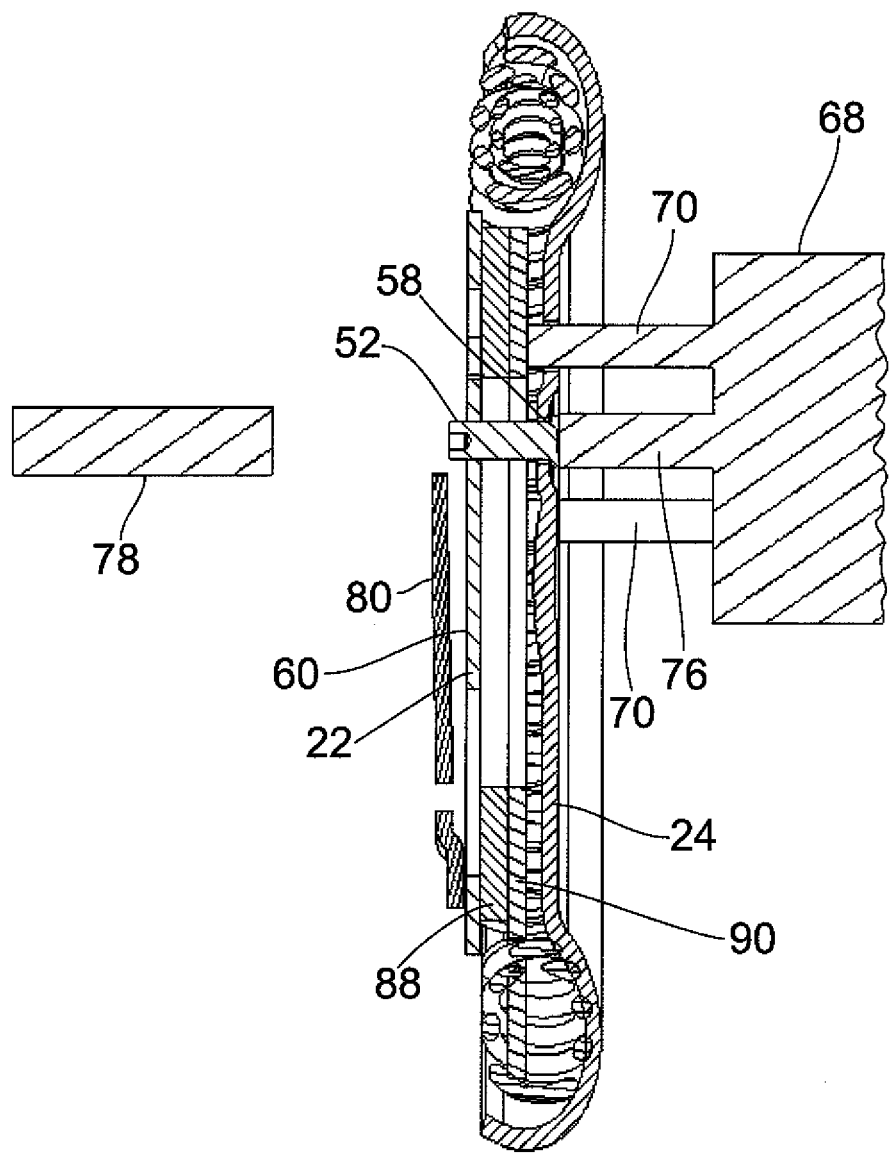
FIG. 5 is a view corresponding to FIG. 2 in an alternative process.
Figure 6:
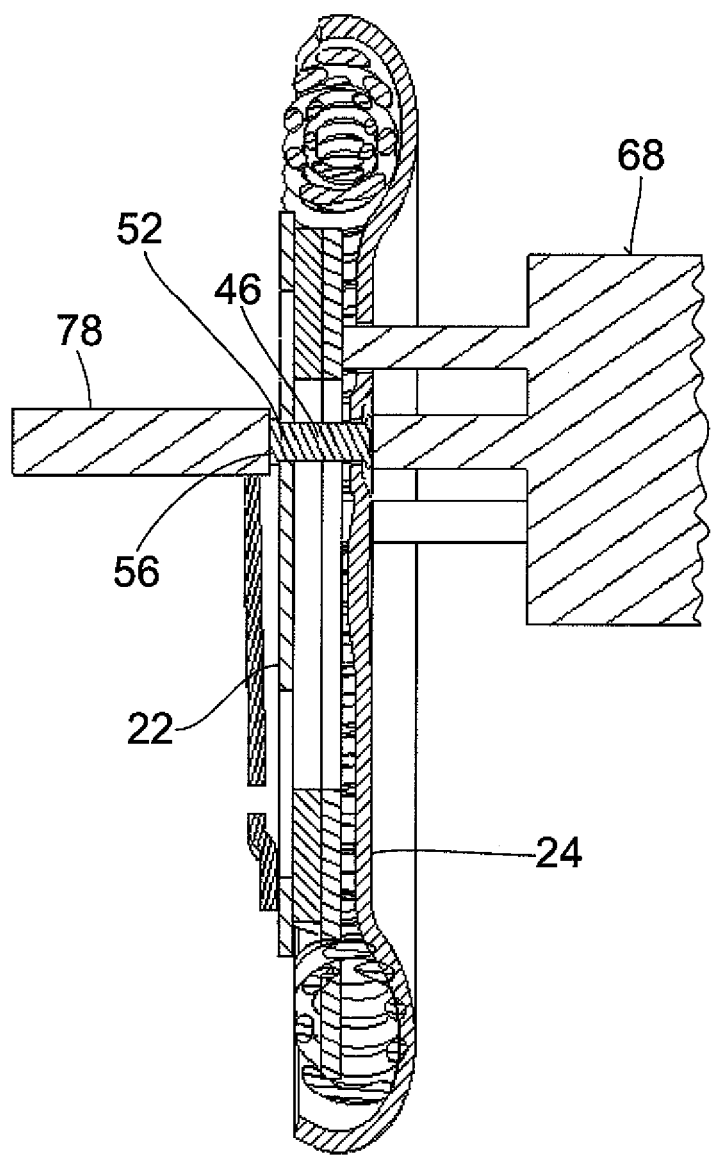
FIG. 6 is a view corresponding to FIG. 3 in the alternative process.

FIGS. 5 and 6 show an alternative process in which particularly the first supporting arrangement 68 is so dimensioned in the area of its first supporting portions 70 that it is not supported directly at the opposite cover plate element 22 as was the case in the preceding example. Rather, in this construction there are additional disk-like structural component parts 88, 90 between the two cover plate elements 22, 24 to be connected with one another in the manner described above which do not permit direct access to the cover plate element 22. In this case, the first supporting portions 70 are dimensioned in such a way, and the length of the second supporting portion 76 is adapted in such a way, that they contact the assembly, in this case the structural component part 90, located between the two cover plate elements 22, 24 when the second supporting portion 76 contacts and supports the rivet head 58. Accordingly, the support of the cover plate element 22 is indirect, which, compared to the embodiments described above, has the drawback that manufacturing tolerances or dimensional tolerances in the structural component parts 88, 90 can cause inaccurate positioning of the cover plate element 22.

The riveting process which is to be carried out in this case corresponds to that described above. The rivet stamp 78 is moved toward the spacer rivet element 46, as is illustrated in FIG. 6, and forms the rivet head 56 at the rivet element end area 52 by applying the corresponding riveting force.

It should be noted that the spacer rivet element 46, which is basically already formed with a pre-shaped rivet head, could also be inserted at a 180-degree rotation in the process described above, i.e., could be positioned in such a way that the rivet head 56 is formed at the rivet element end area 52 which is to be acted upon by the rivet stamp 78, while the other rivet element end area 54 is still not provided with any deformation. This other rivet element end area 54 is supported axially at the second supporting portion 76 which is again positioned in such a way that the desired axial position of the rivet head 58 to be formed can be achieved. The rivet head 56, which is already pre-shaped, is then at an axial distance from the cover plate element 22 before this rivet head 58 is formed. When riveting force is applied and the rivet stamp 78 moves axially in a corresponding manner, the spacer rivet element 46 is displaced axially until the pre-shaped rivet head 56 contacts, e.g., the outer side 60 of the cover plate element 22 in the final state and the rivet head 58 has been formed at the other rivet element end area 54 by abutting in a corresponding manner at the second supporting portion 76.

Figure 7:
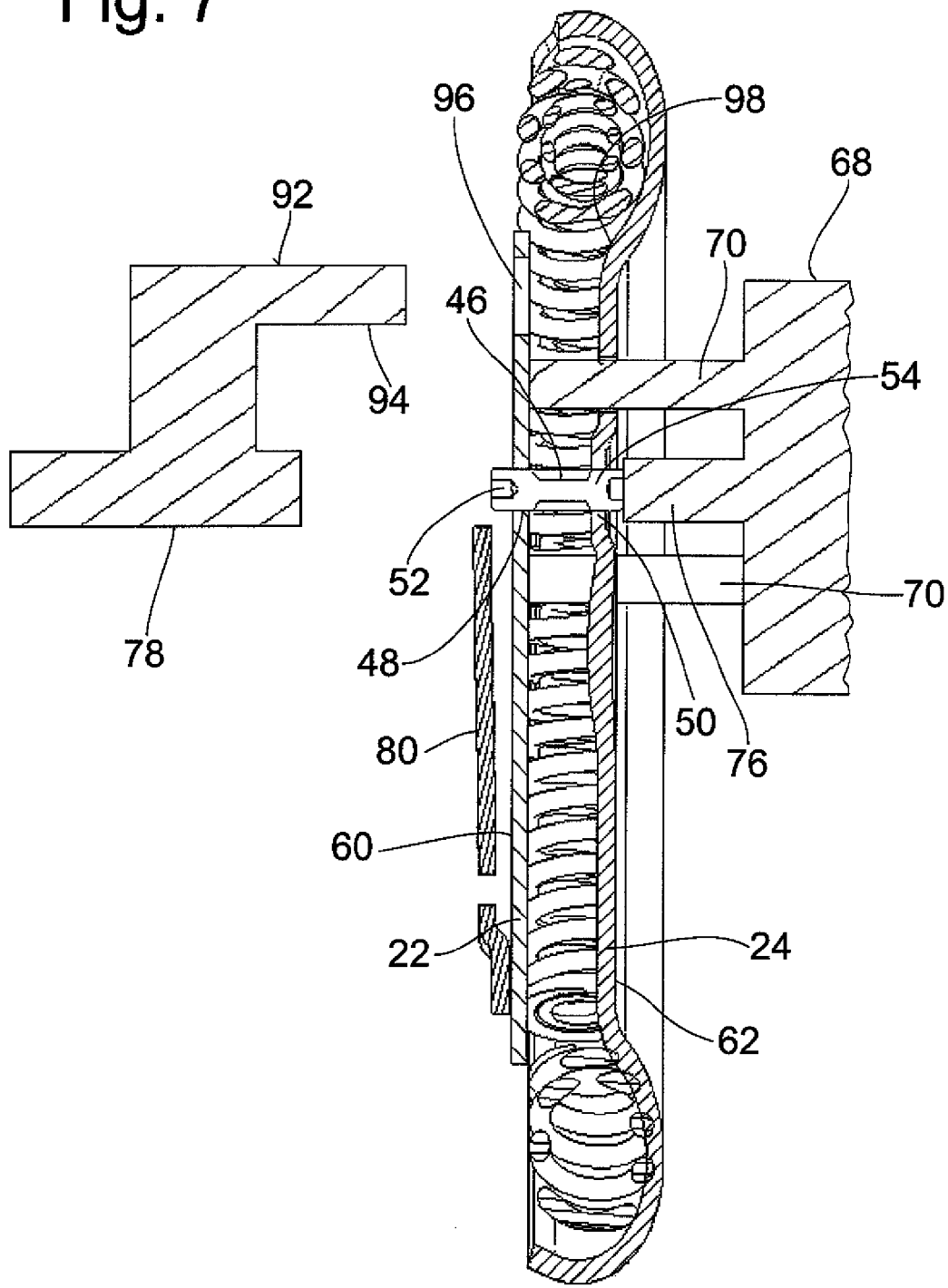
FIG. 7 is another view corresponding to FIG. 2 in another alternative process.

FIG. 7 shows another modification. The first supporting arrangement 68 with its first supporting portions 70 and the second supporting portion 76 are shown. The spacer rivet element 46 to be introduced in this instance is shaped in such a way that it initially has no rivet head in either of its rivet element end areas 52, 54. This means that a rivet head is to be formed in each instance by the support at the second supporting portion 76 as well as by being acted upon by the rivet stamp 78. To ensure not only that the defined positioning of the cover plate element 22, particular in relation to the rivet head to be formed at the rivet element end area 54, is achieved through the support of the cover plate element 22, but also that the cover plate element 24 is held in the defined position with respect to the rivet head to be formed at the other rivet element end area 52, a second supporting arrangement 92 can be provided with one or more third supporting portions 94. This second supporting arrangement 92 which is movable together with the rivet stamp 78, for example, engages through an associated through-opening 96 in the cover plate element 22 by its supporting portion 94 and then, in the course of the axial movement of the rivet stamp 78, comes into contact at the inner side 98 of the cover plate element 24. This provides for a defined relative axial positioning of the two cover plate elements 22, 24 by the first supporting portions 70 on one hand and by the third supporting portion(s) 94 on the other hand in the final position when the two rivet heads are formed.

It should be noted that the second supporting arrangement 92 in the embodiment shown in FIG. 7 can, of course, also be moved, i.e., brought into its supporting position, independently from the rivet stamp 78 and then the rivet stamp 78 is only moved when both the first supporting arrangement 68 and the second supporting arrangement 92 are correctly positioned so as to form the rivet heads by deformation of the spacer rivet element 46.

In so doing, as was described above, depending on whether or not or to what extent the spacer rivet element 46 is made of hardened metal material, it can be provided that a movement play remains between the spacer rivet element 46 and the associated cover plate element 22, 24 in the respective rivet opening 48, 50 in at least one of the rivet element end areas.

Figure 8:
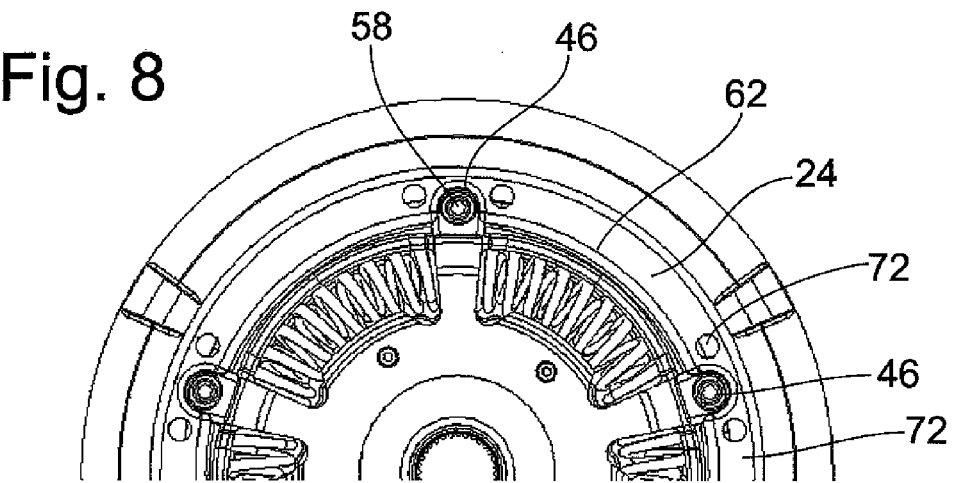
FIG. 8 is a partial axial view of a torsional vibration damper arrangement in which the method according to the invention can be applied.

FIG. 8 shows an axial view of the two structural component parts to be connected to one another considered from the axial side of the cover plate element 24. The spacer rivet elements 46 and their rivet heads 58, which spread out on the outer side 62 of the cover plate element 24, can be seen at several circumferential positions. Two through-openings 72 are associated with each spacer rivet element 46. These through-openings 72 lie, in circumferential direction, on both sides of the spacer rivet element 46 which is to be introduced or which has already been introduced and are also arranged approximately on the same radial level with respect to the center axis of the cover plate elements 22, 24 to be connected to one another. Accordingly, a desired supporting action can be provided on both sides of a spacer rivet element 46 to be inserted by the first supporting portions 70 which are to be inserted into the through-openings 72.

Figure 9:
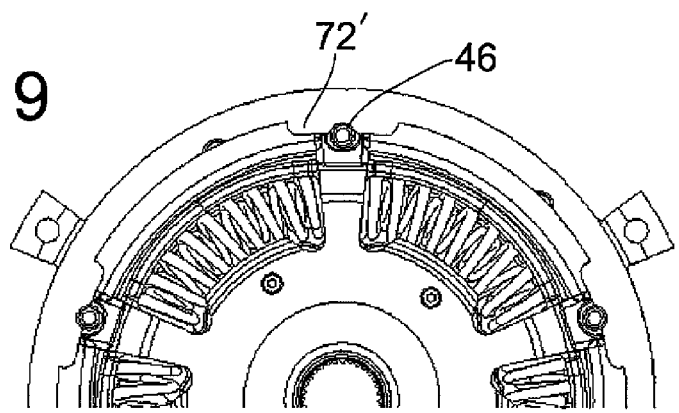
FIG. 9 is a view corresponding to FIG. 8 showing an alternative construction of the torsional vibration damper arrangement.

FIG. 9 shows a variant in which a through-cutout 72' which, for example, is also open toward the radial outer side is provided so as to be associated with a respective spacer rivet element 46. This can be the case, for example, when the first supporting arrangement 68 is used not from the side of the cover plate element 24 with reference to FIG. 2, but from the side of the cover plate element 22 which does not extend as far toward the radial outer side.

Figure 10:
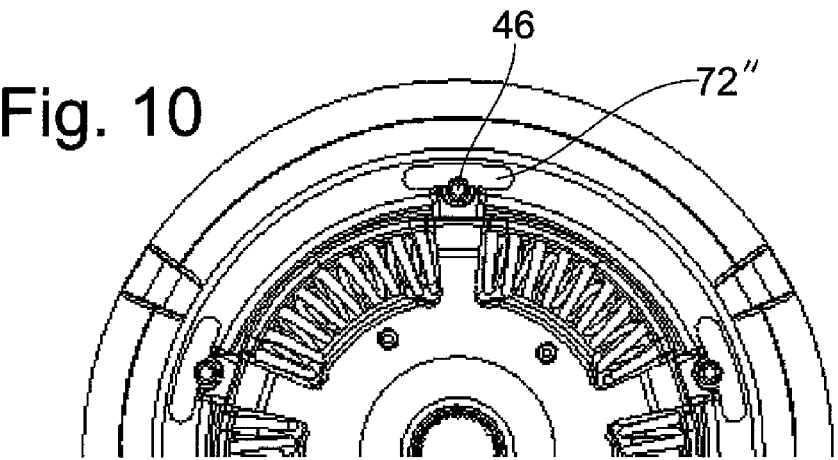
FIG. 10 is another view corresponding to FIG. 8 showing an alternative construction of the torsional vibration damper arrangement.

FIG. 10 shows an arrangement in which a through-cutout 72" similar to an elongated hole is provided and communicates with the rivet opening, not shown here, for a respective spacer rivet element.

It should be noted that, of course, the quantity, size and supporting surface of the first supporting portions 70 can be selected in such a way that the desired supporting action can be achieved, but at the same time structural modifications to the different cover plate elements which could lead to weakening of these structural component parts must be minimized as far as possible. In principle, it could also be conceivable, for example, when five spacer rivet elements 46 are to be provided, to provide a total of three through-openings or cutouts of the type mentioned above so as to be distributed along the circumference in order to ensure a desired defined positioning of the two cover plate elements 22, 24 with respect to one another.

FIGS. 11 and 12 show two variants of spacer rivet elements 46 after they have been arranged at two structural component parts, i.e., again, for example, at the cover plate elements 22, 24. While the construction according to FIG. 12 substantially corresponds to that described above, i.e., after the rivet head 56 is formed in the associated rivet opening 48, the spacer rivet element 46 is, e.g., spread in such a way that it is locked therein so as to be prevented from tilting, FIG. 11 shows a variant in which a step-like widened portion 100 is formed at the spacer rivet element 46 near the rivet element end area 52. This step-like widened portion 100 can lie against the inner side 74 of the cover plate element 22, supported by the positioning of the second supporting portion 76. The riveting process is then carried out in the manner described above so that when the rivet head 58 has already been pre-shaped, for example, the rivet head 56 is produced by the action of the rivet stamp 78. The cover plate element 22 is then clamped between the rivet head 56 and the step-like widened portion 100 so that the spacer rivet element 46 is successfully held at the cover plate element 22 so as to be prevented from tilting or moving. With respect to the other cover plate element, the intermediate space 86 remains so that the two cover plate elements 22, 24 are movable with respect to one another to a certain extent in circumferential direction and also axially to a slight extent, particularly moveable toward one another axially. In the embodiment form shown in FIG. 12, this ability to move relative to one another is provided for by retaining the intermediate space 86 so as to be associated with the cover plate element 24.

Using the riveting device shown herein, it is possible with the process according to the invention that two structural component parts, e.g., disk-shaped structural component parts, which are to be connected to one another are fixed with respect to one another in such a way that a certain maximum measurement in their distance from one another cannot be exceeded without it being necessary for this purpose to use rivet elements which are formed at one, or possibly more, positions with corresponding steps which serve as an abutment, particularly when carrying out a riveting process. This abutment for the structural component parts to be connected to one another is realized according to the invention by the supporting portions of the supporting arrangement or supporting arrangements.

In conclusion, it should be noted that, of course, when there are two structural component parts to be connected to one another, the spacer rivet elements used for this purpose need not all be identically constructed. For example, if required, it is possible to combine differently shaped spacer rivet elements, some of which can not have a fixed engagement with any of the structural component parts to be connected, i.e., can have movement play, while others are fixed in association with one or possibly both of the structural component parts to be connected by corresponding deformation when carrying out the riveting process.

Further, the riveting process according to the invention can, of course, be carried out in such a way that the individual spacer rivet elements to be inserted are introduced successively. Of course, a plurality of, or all of, the spacer rivet elements can also be inserted simultaneously when the riveting device is designed in a corresponding manner with the respective required supporting portions in association with different spacer rivet elements to be inserted.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method for riveting two cover plate elements of a torsional vibration damper arrangement arranged with their inner sides facing one another and with their outer sides facing away from one another at a distance from one another by at least one spacer rivet element comprising:
   a) positioning the at least one spacer rivet element at the two cover plate elements such that rivet element end areas extend through rivet openings provided in the two cover plate elements so as to be associated with the rivet element end areas;
   b) supporting a first rivet element end area at the outer side of one of the two cover plate elements;
   c) supporting the other of the two cover plate elements at its inner side;
   d) applying a riveting force to a second rivet element end area opposite the first rivet element end area to deform the first rivet element end area and form a rivet head; and
   e) supporting the other of the two cover plate elements by a first supporting arrangement that extends through one of the two cover plate elements.

2. The method according to claim 1, wherein the first supporting arrangement supports the other of the two cover plate elements by at least one first supporting portion.

3. The method according to claim 1, wherein the first supporting arrangement engages directly at the other of the two cover plate elements for supporting the same.

4. The method according to claim 1, wherein the first supporting arrangement engages at an assembly that supports the other of the two cover plate elements and which is arranged between the two cover plate elements.

5. The method according to claim 1, wherein the first supporting arrangement comprises a second supporting portion for supporting the rivet element end area associated with the one of the two cover plate elements.

6. The method according to claim 5, wherein the at least one first supporting portion and the second supporting portion are arranged so as to be substantially immovable relative to one another at least when carrying out the riveting process.

7. The method according to claim 1, further comprising pressing the other of the two cover plate elements into supporting contact is associated with the first supporting arrangement with a hold-down arrangement.

8. The method according to claim 7, wherein the hold-down arrangement comprises a preloading assembly configured to act on the outer side of the other of the two cover plate elements.

9. The method according to claim 8, wherein the riveting force is introduced by a rivet stamp acting upon the rivet element end area associated with the other of the two cover plate elements.

10. The method according to claim 9, wherein a preloading arrangement is movable at least in some areas with the rivet stamp toward the other structural component part.

11. The method according to claim 1, wherein step c) further comprises supporting of one of the two cover plate elements at its inner side.

12. The method according to claim 11, wherein the one of the two cover plate elements is supported by a second supporting arrangement which extends through, or past, the other structural component part.

13. The method according to claim 12, wherein the second supporting arrangement comprises at least a third supporting portion which is connected with the rivet stamp so as to be substantially immovable at least when carrying out a riveting process.

14. The method according to claim 13, wherein at least one spacer rivet element used for riveting the two cover plate elements, the at least one spacer rivet element has no supporting area between its rivet element end areas for supporting the two cover plate elements toward one another.

15. The method according to claim 1, wherein at least one spacer rivet element used for riveting the two cover plate elements has a pre-shaped rivet head in one of its rivet element end areas configured to be deformed in its other rivet element end area to form a rivet head when acted upon by the riveting force.

16. The method according to claim 1, wherein at least one spacer rivet element used for riveting the two cover plate elements does not have a pre-shaped rivet head in either of its rivet element end areas and is deformed in both rivet element end areas to form respective rivet heads when acted upon by the riveting force.

17. The method according to one of claim 1, wherein at least one of the rivet openings associated with a spacer rivet element is formed in one of the two cover plate elements so as to be overdimensioned with respect to an outer dimensioning of the spacer rivet element in the associated rivet element end area.

18. The method according to claim 17, wherein the overdimensioning is at least partially maintained when deforming the spacer rivet element in at least one of the rivet element end areas.

19. The method according to claim 18, wherein the spacer rivet element is made with hardened metal material in at least in the one rivet element end area.

20. The method according to claim 17, wherein the overdimensioning is substantially eliminated in its entirety in this rivet element end area when deforming the spacer rivet element.

21. The method according to claim 20, wherein the spacer rivet element is made of unhardened metal material at least in the one rivet element end area.

\* \* \* \* \*